INVENTOR
ISAO OTA

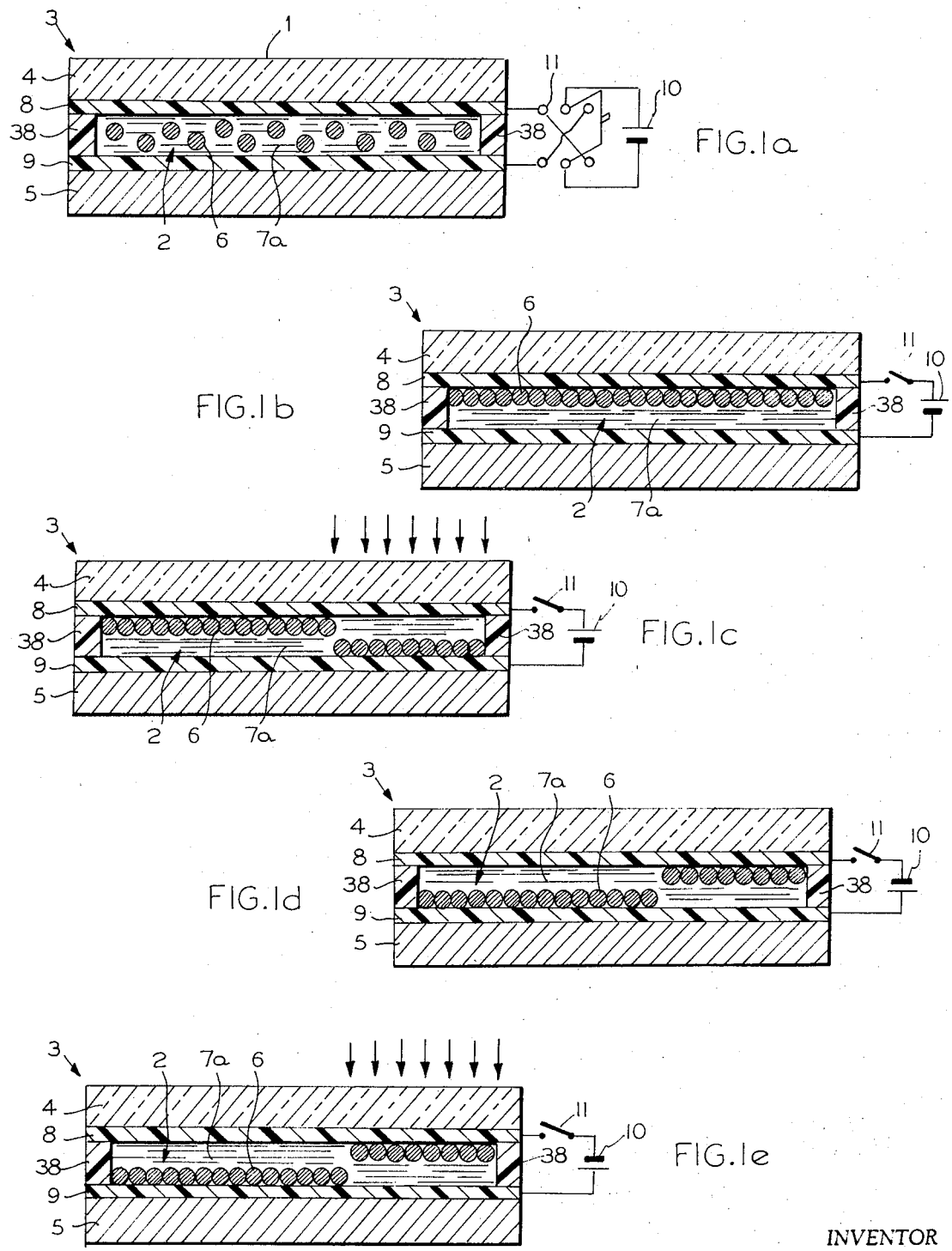

United States Patent Office 3,689,399
Patented Sept. 5, 1972

3,689,399
**PHOTOELECTROPHORETIC IMAGE
REPRODUCTION DEVICE**
Isao Ota, Osaka, Japan, assignor to Matsushita Electric
Industrial Co., Ltd., Osaka, Japan
Filed Sept. 14, 1970, Ser. No. 72,033
Claims priority, application Japan, Sept. 20, 1969,
44/74,794, 44/75,555
Int. Cl. B01k 5/00
U.S. Cl. 204—299
24 Claims

ABSTRACT OF THE DISCLOSURE

A photoelectrophoretic image reproduction device has an electrophoretic suspension layer including a dispersion of at least one photosensitive electrophoretic material in a finely divided powder form suspended in a colored suspending medium interposed between a pair of electrodes, at least one of which is substantially transparent. Means are provided to impose a D.C. electric field across the electrophoretic suspension layer between the electrodes and to expose the electrophoretic suspension layer to an image with actinic electromagnetic radiation through the transparent electrode, said electric field and said image changing the electrophoretic property of said one photosensitive electrophoretic material so as to change electrophoretically the spatial distribution of said one photosensitive electrophoretic material, whereby an image is reproduced.

BACKGROUND OF THE INVENTION

This invention relates to a display and/or recording device, and particularly to a photoelectrophoretic display and/or recording device comprising at least one photosensitive electrophoretic material suspended in a colored suspending medium.

Methods and apparatus for producing an image by photoelectrophoresis are described, for example, in U.S. Pats. 2,940,847, 3,100,426 and 3,140,175 to Kaprelian; 3,383,993 to Yeh; 3,384,488 and 3,384,565 to Tulagin and Carreira; and 3,384,566 to Clark.

According to these prior art methods, charged particles in a colorless suspending medium are transported to the surface of an electrode so as to reproduce a pattern corresponding to that of an input light image. A visible image can be obtained by removing the electrode from the surface of the suspension so that the suspension cannot be enclosed in a housing. The particles act as the primary image colorant, but the suspending medium does not, because it is not colored. That is, the prior art does not seek a variation in the optical reflective property of a suspension itself by a change in the spatial distribution of electrophoretic particles in the suspension. Therefore, the prior art relates essentially to the reproduction of a permanent visible image, but not to a changeable display system.

SUMMARY OF THE INVENTION

An object of this invention is to provide a device for display and/or recording in which an electrophoretic suspension layer is enclosed which has at least one photosensitive electrophoretic material suspended in a colored suspending medium.

A further object of this invention is to provide a device for reproducing a positive and/or negative image in a fast and simple manner. A still further object of this invention is to provide a large and/or flat or flexible display panel comprising an electrophoretic suspension layer.

These objects are achieved by a device for display and/ or recording according to the present invention which comprises an electrophoretic suspension layer including a dispersion of at least one photosensitive electrophoretic material in a finely divided powder form suspended in a colored suspending medium, said suspension layer having two opposite major surfaces: a first transparent electrode and a second electrode which are spaced from and opposed to each other and are coupled to said two opposite major surfaces of said suspension across said suspension layer through said electrodes; and means for applying an electric field across the suspension layer between the electrodes and nearly simultaneously exposing said suspension layer to an image with an actinic electromagnetic radiation, whereby an image is reproduced on the suspension layer.

Other objects and advantages of this invention will be apparent from the following description, the accompanying drawings, and the appended claims.

BRIEF DESCRIPTION OF THE DRAWINGS

In the drawings:

FIGS. 1a–1f are cross-sectional views of an image reproduction panel in accordance with this invention;

Figure 1F:
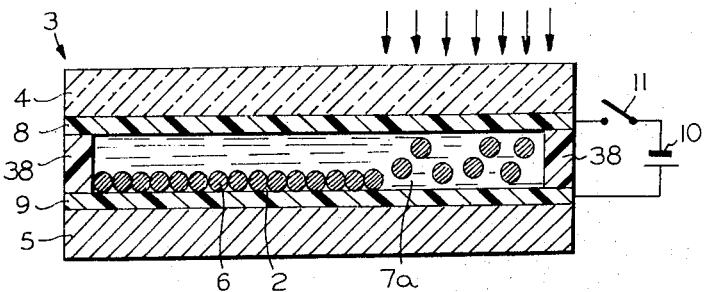

The sizes and shapes of elements of the drawings should not be considered as actual sizes or even proportional to actual sizes because many elements have been purposely distorted in size or shape in order to more fully and clearly descrbe the invention. The word "reproduction" as used in the present application means "display and/or recording."

DETAILED DESCRIPTION OF THE DRAWINGS

Referring to FIG. 1a, reference character 1 designates, as a whole, a photoelectrophoretic image reproduction panel which has an electrophoretic suspension layer 2 therein..

When said suspension layer 2 is in a fluid state, it is enclosed in a housing 3 having a frame 38 and two opposite major housing walls 4 and 5 which are, for example, both transparent. Said suspension layer 2 has two opposite major surfaces along said two opposite major housing walls 4 and 5 and includes a dispersion of at least one photosensitive electrophoretic material 6 in a finely divided powder form suspended in a colored suspending medium 7a. The particles of the material 6 are shown greatly enlarged in this and subsequent figures for clarity of illustration. Said two opposite major surfaces of said suspension layer 2 are in contact, respectively, with a first electrode 8 and a second electrode 9 which are, for example, both transparent and are attached to the inner surfaces of said two opposite major housing walls 4 and 5.

Said first electrode 8 and second electrode 9 are connected to output terminals of a D.C. voltage source 10 through a switching device 11. Before a D.C. electric field is supplied to said suspension layer 2 from said D.C. voltage source 10, the photosensitive electrophoretic material 6 in a finely divided powder form is distributed uniformly throughout the suspending medium 7a, as shown in FIG. 1a. When the photosensitive electrophoretic material 6 is, for example, white and the colored suspending medium 7a is, for example, black, the suspension layer 2 appears gray at both electrodes 8 and 9 under the illumination of, for example, an incandescent lamp. In this and the following figures, a source of illumination is not shown. When the gray suspension layer 2 is subjected to a D.C. electric field by said D.C. voltage source 10 and the switching device 11 without having been subjected to any radiation, the photosensitive electrophoretic material 6 is caused to move electrophoretically in a direction either to a cathode or to an anode, depending upon its polarity. For example, if the material 6 has negative polarity in said colored suspending medium 7a, it moves and is deposited on the anode 8 and has a spatial distribution as shown in FIG. 1b.

The resultant suspension layer 2 has a different spatial distribution of the material 6 and a different optical reflective property from the original suspension layer 2 having the uniform distribution of the material 6. When one observes the panel 1 under illumination after the removal of the applied voltage, the panel 1 is white on the anode side because the layer of the white material 6 deposited on the anode hides the black suspending medium 7a. On the other hand, the panel 1 is black on the cathode side because the layer of the black suspending medium 7a hides the layer of the white material 6 deposited on the anode.

If the suspension layer 2 is exposed to an image of an actinic electromagnetic radiation (shown as arrows) through the transparent electrode 8 as shown in FIG. 1c while the electrodes 8 and 9 are connected to the anode and the cathode terminals of the voltage applying means 10, respectively, the photosensitive electrophoretic material 6 exposed to the radiation image has a reduced resistivity and therefore charge exchange occurs between the material 6 and the electrode 8 so as to change the polarity of the material 6. The material 6 acquires a positive charge from the anode 8 and is repulsed from the anode 8 and moves toward the cathode 9 and is deposited thereon. The material 6 exposed to no radiation does not exchange charge with the electrode 8 because of its high resistivity and remains deposited on the anode 8. Thus the suspension layer 2 has a spatial distribution of the material 6 corresponding to the input image of actinic electromagnetic radiation as shown in FIG. 1c. When the applied voltage is removed and the panel 1 is illuminated with, for example, an incandescent lamp at both electrodes 8 and 9, one can observe a negative image at the electrode 8 and a positive image at the electrode 9. The material 6 and the suspending medium 7a both act as the colorant in the reproduced image.

In the above panel a D.C. voltage is applied across the suspension layer 2 so as to produce a spatial distribution of the material 6 as shown in FIG. 1b before the suspension layer 2 is exposed in a radiation image. But one can apply the D.C. voltage simultaneously with the exposure of the suspension layer 2 having a uniform spatial distribution of the material 6 as shown in FIG. 1a to a radiation image or after the suspension layer 2 begins to be exposed to a radiation image. If the material 6 has a reduced resistivity after the radiation is removed, a D.C. voltage can be applied across the suspension layer 2 during reduction of the resistivity of the material 6 after the exposure of the suspension layer 2 to a radiation image is stopped.

When a D.C. voltage of reversed polarity is applied across the suspension layer 2 having a spatial distribution of the material 6 as shown in FIG. 1c, and the panel is not exposed to any further radiation, the suspension layer 2 has a spatial distribution of the material 6 as shown in FIG. 1d. When one observes the panel 1 under illumination after the applied voltage with reversed polarity is removed, a positive image and a negative image are observed at the electrodes 8 and 9, respectively. If the colors of the suspending medium 7a and the material 6 are opposite from that described in the foregoing section, i.e. the suspending medium is white and the material is black, the images reproduced at the electrodes 8 and 9 are all reversed with respect to negative and positive from those images as described in the foregoing section.

As is apparent from the foregoing, the photoelectrophoretic image reproduction device of the present invention can reproduce very simply a visible positive and/or negative image in one step by applying an electric field and an input image of actinic electromagnetic radiation to the suspension layer 2. Besides, the panel 1 can be used as a changeable display device in a manner described below. The images reproduced at the electrodes 8 and 9, as shown in FIG. 1c or 1d, can be easily erased by applying an actinic electromagnetic radiation uniformly over all the suspension layer 2 through the electrode 8 or 9 and by simultaneously applying a D.C. voltage across the suspension layer 2. For example, when actinic electromagnetic radiation is projected uniformly on the suspension layer 2 through the electrode 9 while the electrodes 8 and 9 are kept as an anode and a cathode, respectively, the images reproduced as shown in FIG. 1c or 1d are erased and the suspension layer 2 has a spatial distribution of the material 6 as shown in FIG. 1b. A new image can be reproduced on the resultant suspension layer 2 in a manner similar to that described in the foregoing section. When an input radiation image and the actinic electromagnetic radiation projected uniformly on the suspension layer 2 for erasure are in the same direction, for example, when they are projected on the suspension layer 2 through the electrode 8, a D.C. voltage and the uniform actinic electromagnetic radiation through the electrode 8 are applied to the suspension layer 2 having a reproduced image so as to erase the image and to move and to deposit the material 6 on the electrode 9. After that, a new image of an actinic electromagnetic radiation is projected on the suspension layer 2 through the electrode 8 during the application of a D.C. voltage with reversed polarity across the suspension layer 2.

In the foregoing section, it is supposed that the photosensitive electrophoretic material 6 in the suspension layer 2 changes its charge polarity at the electrode under the influence of the actinic electromagnetic radiation and the applied electric field. But it is not always necessary for the photosensitive electrophoretic material 6 to change its charge polarity. The image can also be reproduced when the photosensitive electrophoretic material 6 changes the amount of its charge, and therefore its electrophoretic mobility, as a result of charge exchange with the electrode under the influence of the actinic electromagnetic radiation and the applied electric field. This method of image reproduction is explained below.

For example, when a D.C. voltage and an image of actinic electromagnetic radiation are applied to the suspension layer 2 having a spatial distribution of the material 6 as shown in FIG. 1b, originally negatively charged material 6 in the image projected area reduces the amount of its charge as a result of charge exchange with the anode 8. If the reversed D.C. voltage is applied between the electrodes 8 and 9 after the anode 8 has neutralized the original negative charge of the material 6 in the image projected area and the exposure of the suspension layer 2 to the radiation image is stopped, the material 6 with original negative charge which is not exposed to radiation moves electrophoretically toward the anode 9 and is deposited on the anode 9, but the neutralized material 6 in the image projected area cannot move and remains deposited on the cathode 8 as shown in FIG. 1e. When the material 6 is light in color and the suspending medium 7a is dark in color, a positive image and a negative image are observed at the electrodes 8 and 9, respectively, under illumination after the D.C. voltage is removed. Even when the material 6 in the image projected area is not completely neutralized and has a reduced negative charge, the material 6 with reduced negative charge, having a reduced electrophoretic mobility, therefore moves toward the anode 9 under the reversed electric field at a lower velocity than that of the material 6 in the area not exposed to the radiation image. When the material 6 in the area not exposed to the radiation image is deposited heavily on the anode 9 and the material 6 in the image projected area has not quite reached the anode 9, the applied D.C. voltage with reversed polarity is removed, so that the images are reproduced at the electrodes 8 and 9, as shown in FIG. 1f.

It is also possible to reproduce an image by increasing the amount of charge, thereby increasing the electrophoretic mobility of the material 6. For example, if the material 6 suspended as shown in FIG. 1a. is originally in an electrically almost neutral condition, and a D.C. voltage is applied across the suspension layer 2 while an image is projected on the suspension layer 2 through, for example, the electrode 8, an image is reproduced. That is, the electrically neutral material 6 which comes into collision with the electrode 8 in the image projected area by, for example, Brownian motion, acquires a charge from the electrode 8 under the influence of the actinic electromagnetic radiation and the applied electric field, and moves electrophoretically toward the electrode 9 and is deposited thereon. If the material 6 is not electrically neutral and originally has a weak charge, for example, a weak negative charge in the spatial distribution, as shown in FIG. 1a, then a D.C. voltage is applied between the electrodes 8 and 9, as an anode and a cathode, respectively, so as to transfer the negative material 6 to the anode 8. After that, an image of an actinic electromagnetic radiation is projected on the suspension layer 2 through the electrode 8 and simultaneously a D.C. voltage with reversed polarity is applied between the electrodes 8 and 9. Originally negative material 6 on the electrode 8 increases its negative charge by acquiring negative charge from the cathode 8 under the influence of the actinic electromagnetic radiation and the applied electric field. Under the influence of the applied voltage, the material 6 which has acquired a strong negative charge in the image projected area moves electrophoretically toward the electrode 9 at a higher speed, while the material 6 in the area not exposed to an image moves at a lower speed because of its smaller electrophoretic mobility.

By removing the applied voltage after application for a suitable length of time, the desired images can be obtained at the electrodes 8 and 9.

The electrophoretic property, that is, charge polarity or electrophoretic mobility, of the photosensitive electrophoretic material 6 changes with the charge exchange at the electrode under the influence of the actinic electromagnetic radiation and applied electric field. The change in the electrophoretic property of the material 6 depends upon the photosensitivity of the material 6, the strength of the radiation, length of time of application of the radiation, the strength of the applied electric field at the position of the material 6, length of time of application of the applied electric field, the surface conditions of the electrode and the material 6, the property of the colored suspending medium 7a, and so on. The advantage in producing an image by changing the amount of charge of the material 6 is a high sensitivity so that a weak input image of actinic electromagnetic radiation can reproduce a visible image with high speed.

The photosensitive electrophoretic material 6 in this invention can be any suitable and available material in a finely divided powder form which can change its electrophoretic property when it is exposed to actinic electromagnetic radiation and is subjected to an electric field. The photosensitive electrophoretic materials 6 which will be operable are, for example, cadmium sulfide, cadmium sulfoselenide, zinc oxide, titanium dioxide, zinc sulfide, sulphur selenium, mercuric sulfide, lead oxide, lead sulfide, phthalocyanines, azo compounds or quinacridones. The material 6 includes materials which are made up of only the pure photosensitive material or a sensitized form thereof, solid solutions or dispersions of the photosensitive material in a resin binder, multilayers of particles in which the photosensitive material is included in one of the materials and where other materials provide light filtering action in an outer layer.

Average particle sizes of the material 6 which will be operable usually range from $0.1\mu$ to $50\mu$.

The colored suspending medium 7a can be prepared so as to have the desired color by dissolving a colored substance, such as a dye, in a colorless liquid which is, for example, kerosene, carbontetrachloride or olive oil. It is preferred to add any suitable and available control agent such as a charge control agent, dispersion agent, stabilizing agent or sensitizing agent to the suspension layer to provide a stable and/or highly photosensitive suspension layer. A surface active agent, a metallic soap, oil or resin dissolved in the suspension layer acts as a control agent in the present invention.

A housing 3 for use in the device according to the present invention can be prepared by using any available material which is inert to the suspending medium and the photosensitive electrophoretic material. For example, a plastic sheet having a major center, part cut out can be used for a frame 38 of the housing 3, as shown in FIG. 1a.

One of the opposite major housing walls can be prepared by adhering to the frame 38 a transparent plate 4 having a transparent electrode 8 formed thereon. An operable plate is a transparent glass plate having a transparent thin film of tin oxide ($SnO_2$) or cuprous iodine (CuI) formed thereon or a transparent plastic sheet such as polyester, cellulose acetate or cellophane having a transparent thin film of cuprous iodine (CuI) or a thin metallic film thereon. The other of the two opposite major housing walls can be prepared by adhering to the frame 38 a transparent plate 5 having a transparent electrode 9 formed thereon. The transparent plate 5 and electrode 9 can be similar to the plate 4 and electrode 8 as described above. The housing 3 can have an inlet and an outlet, for example, at the two corners thereof. The electrophoretic suspension having at least one photosensitive electrophoretic material in a finely divided powder form suspended in a colored suspending medium can be poured into the housing through the inlet formed in one corner of the housing. The inlet and the outlet are closed after the housing is filled with the suspension.

One can use any appropriate apparatus for applying an electric field across the suspension layer through the two electrodes. For example, a D.C. pulse generator, a battery or any other D.C. source can be used.

The actinic electromagnetic radiation includes visible light, infrared light, ultraviolet light, X-ray or $\gamma$-ray.

Figure 2A:
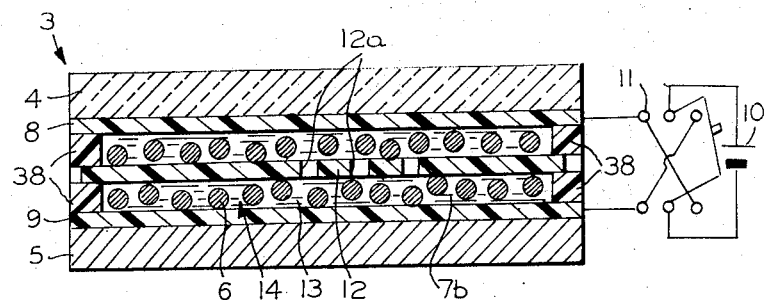
FIGS. 2a and 2b are cross-sectional views of an image reproduction panel according to another embodiment of this invention.
Figure 2B:
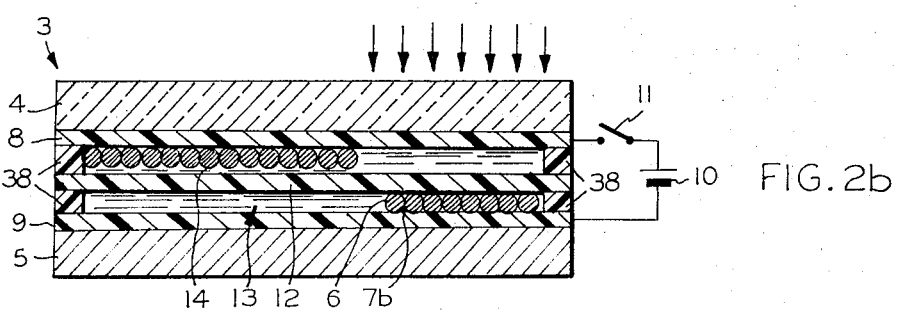

Referring to FIGS. 2a and 2b, wherein similar reference characters designate components similar to those of the foregoing figures, an electrophoretic suspension layer 14 consists of a dispersion of at least one photosensitive electrophoretic material 6 suspended in a colored suspending medium 7b. The colored suspending medium 7b consists of a colorless suspending medium 13 having a colored porous layer 12 inserted therein having pores 12a therein (shown greatly enlarged). When the material 6 is, for example, white and has originally, for example, a negative charge and the porous layer 12 is, for example, black, the suspension layer 14 is gray at both electrodes 8 and 9 under illumination of white light in the almost uniform spatial distribution of the material 6 throughout the suspension layer 14 as shown in FIG. 2a. A D.C. electric field is applied across the suspension layer 14 between the electrodes 8 and 9 as an anode and a cathode, respectively. Simultaneously or after a short time period, an image of actinic electromagnetic radiation is projected on the suspension layer 14 through the electrode 8. The photosensitive electrophoretic material 6 having a reduced resistivity due to the absorption of the radiation exchanges its charge with the electrode 8 so as to have the electrophoretic property changed as described with reference to FIGS. 1a–1f. If the material 6 has the charge polarity changed, the material 6 having a positive charge in the image projected area moves electrophoretically toward the cathode 9 and is caused to pass through the colored porous layer 12 and is deposited on the cathode 9 under the applied electric field as shown in FIG. 2b. After removal of the applied voltage and the projected image, the panel has a negative image and a positive image at the electrodes 8 and 9, respectively, under illumination. In a similar manner as described in connection with FIGS. 1a–1f, images can also be reproduced with high photosensitivity when the material 6 does not have the charge polarity changed, but has the electrophoretic mobility changed.

Colored porous layer 12 in the present invention can be made from any sheet material having pores therein. The size of the pores must be large enough to pass the particles of the electrophoretic material 6 therethrough and small enough to hide the electrophoretic material 6 from sight. Operable materials are a cloth or a mesh woven of natural or artificial fibers; a fibroid sheet having thousands of irregular pores; a thin plate with a lot of tiny holes; and a sheet having granular material bound together with resin or an adhesive agent to form a large number of pores. The colorless suspending medium 13 which is operable is insulating liquid such as, for example, kerosene, olive oil, cyclohexane, paraffin liquid, mineral oil or trichlorotrifluoroethane.

Figure 3A:
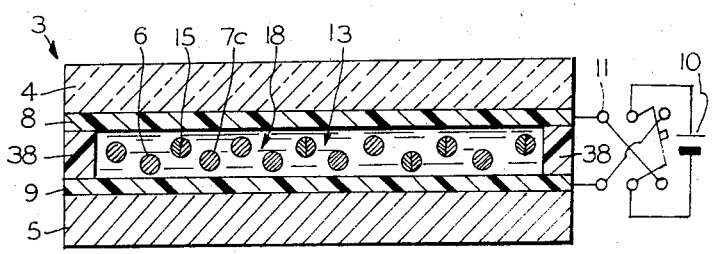
FIGS. 3a and 3b are cross-sectional views of an image reproduction panel according to still another embodiment of this invention.
Figure 3B:
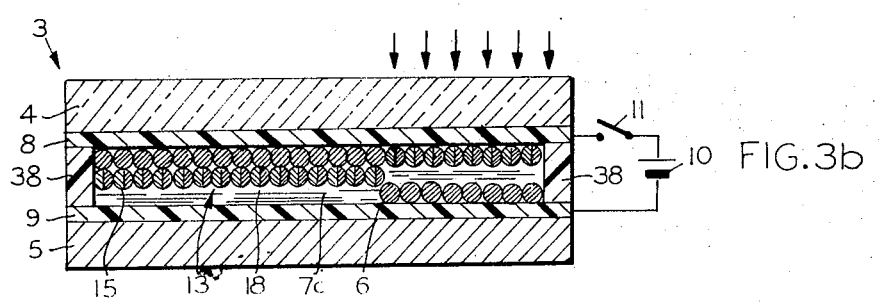

Referring to FIGS. 3a and 3b, wherein similar reference numbers designate components similar to those of the foregoing figures, a colorless suspending medium 13 has at least one colored material 15 in a finely divided powder form suspended therein. The colorless suspending medium 13 and the colored material 15 suspended therein together make up the colored suspending medium 7c. At least one photosensitive electrophoretic material 6 is suspended in the colored suspending medium 7c and together the materials 6 and 15 and the medium 13 make up the electrophoretic suspension layer 18, as shown in FIG. 3a.

The colored material 15 can be not only electrically neutral, but also positively or negatively charged.

The colored material 15 can be, of course, nonphotosensitive, but may be photosensitive.

The colored material 15 must have a different color from that of the photosensitive electrophoretic material 6. Operable colored materials 15 are pigment particles such as, for example, carbon black, black iron oxide, watchung red, hansa yellow, titanium dioxide, phthalocyanines, prussian blue or indigo.

If the colored material 15 is non-photosensitive and is negatively charged in the suspending medium 13 as well as the material 6 and the electrophoretic mobility of the material 15 is smaller than the original mobility of the material 6, the material 6 moves electrophoretically toward the anode at a higher speed than that of the material 15 upon the application of a D.C. voltage across the suspension layer 18. If an image of actinic electromagnetic radiation is projected on the suspension layer 18 through the anode during the application of the D.C. voltage, the material 6 which reaches the anode 8 in the image projected area has the electrophoretic property changed, for example, its charge polarity is changed, and it moves electrophoretically toward a cathode 9. In the area on which no image is projected, the applied D.C. electric field deposits mainly the material 6 on the anode 8 at first, and later deposits mainly the material 15 thereon, as shown schematically in FIG. 3b, whereby images can be seen at both electrodes under illumination after removal of the applied voltage. The reproduced image has, at the electrode 8, the color of the material 15 in the image projected area and has the color of the material 6 in the area not exposed to the radiation. On the other hand, the reproduced image at the electrode 9 has the colors of the materials 15 and 6 in the non-image area and the image area, respectively. When the material 15 is electrically neutral and is non-photosensitive, the colored suspending medium 7c is almost similar to the colored suspending medium 7a.

As is apparent from the foregoing description and figures, the colored suspending medium in the present invention can be essentially one of three kinds. The first kind of colored suspending medium is a colored solution as described in FIGS. 1a–1f. The second one is a colorless suspending medium having a colored porous layer inserted therein as described in FIGS. 2a and 2b. The third one is a colored suspension as described in FIGS. 3a and 3b. It is also possible to use in the present invention such a colored suspending medium as a colored solution or colored suspension having further a colored porous layer inserted therein or a colored solution having further a colored material in a finely divided powder form suspended therein. That is, the colored suspending medium in the present invention is defined as the residual component, except one photosensitive electrophoretic material, of the electrophoretic suspension layer and it is substantially opaque. The colored suspending medium and the one photosensitive electrophoretic material must have different colors from each other. Then the change in the spatial distribution of the one photosensitive electrophoretic material in the colored suspending medium causes a change in the optical reflective property of the suspension layer itself. Therefore, the reproduced image can have the color of the one photosensitive electrophoretic material only, the colored suspending medium only, or a mixture of the color of the one photosensitive electrophoretic material and the color of the colored suspending medium. The electrophoretic suspension layer in the present invention can comprise more than two kinds of photosensitive electrophoretic materials suspended therein.

In the device in accordance with this invention, a D.C. electric field and an image of actinic electromagnetic radiation are applied to the electrophoretic suspension layer for reproducing an image. The D.C. electric field can begin to be applied across the suspension layer before or simultaneously with or after the image begins to be projected on the suspension layer. The D.C. electric field with either polarity is usually applied across the suspension layer at least while the image is projected on the suspension layer. A second electric field with reverse polarity is sometimes applied across the suspension layer to which has been applied the first D.C. electric field and the image dependent upon the property of the suspension layer which is used and the method of image reproduction as described in the foregoing description.

In the photoelectrophoretic image reproduction panel of the present invention, as shown in FIGS. 1a–1f, 2a and 2b, or 3a and 3b, it is not always necessary that both the aforesaid two opposite major housing walls and both the aforesaid first electrode and second electrode be transparent. It is possible to prepare an image reproduction panel in which a reproduced image is visible only at one side by employing one transparent housing wall and one transparent electrode corresponding to said one transparent housing wall. The other housing wall can be made of an opaque conductive plate such as, for example, a metal plate which acts as one of the two electrodes. The photosensitive electrophoretic material 6 is supposed to be originally electrically neutral or originally of a single polarity, that is, negative or positive, in the colored suspending medium in the foregoing description. But a bipolar suspension layer in which the material 6 consists originally of a mixture of positively charged and negatively charged particles can also be used in the present invention.

The image reproduced in the present invention can have a halftone appearance. The halftone consists of a color which is a mixture of the colors of the photosensitive electrophoretic material and the colored suspending medium. For example, in FIG. 1c, when viewed through the electrode 8, the image area exposed to strong radiation has no material 6 on the electrode 8 and has only the color of the colored suspending medium 7a, if the layer of the colored suspending medium 7a is opaque enough to hide the material 6 on the electrode 9 and the image area exposed to weak radiation has the material 6 on the electrode 8 in an amount which is insufficient to be opaque and has a halftone appearance dependent upon the amount of the material 6 deposited on the electrode 8.

The non-image area where no radiation is projected has the material 6 in great quantities on the electrode 8 and can have the same color as the material 6.

The electrophoretic material in a finely divided powder form deposited on an electrode surface by electrophoresis will stay on the electrode even after removal of an applied electric field. This means that the image reproduction device according to the present invention can memorize the reproduced image without using further electric power. For producing a recorded image, that is, a hard copy, one can use, for example, suspending medium which is in a solid state at room temperature and in a liquid state above room temperature. Suspending media which are operable for this purpose are, for example, waxes such as beeswax, vegetable wax, paraffin or synthetic wax. Such wax is colored above room temperature by adding dye or pigment particles thereto or by inserting a colored porous layer therein. When using such a wax as a suspending medium, the device according to the present invention must be kept at a temperature higher than room temperature for producing the display or recording. After the device is subjected to a D.C. electric field and the image of actinic electromagnetic radiation at the higher temperature to electrophoretically vary the spatial distribution of said electrophoretic material, it is cooled to room temperature to produce a recorded image. If it is desired to erase the recorded image, the device is subjected to a D.C. electric field and a uniform radiation at the higher temperature.

When the suspending medium consists of a thermosetting material which is in a liquid state at room temperature, one can produce a permanent display by heating the suspending medium after the electrophoretic movement of the electrophoretic material. Thermosetting materials which are operable as suspending media are, for example, drying oil such as linseed oil, soya oil or tung oil. These oils are colored so as to have a desired color by adding dye or pigment particles thereto or by inserting a colored porous layer therein.

When a colored suspending medium in a liquid state at room temperature includes a fixing agent dissolved therein such as, for example, polystyrol, vinyl acetate resin or linseed oil which fixes the electrophoretic material in a finely divided powder form, one can obtain a hard copy having a permanently visible image reproduced thereon by evaporating or exhausting the residual suspending medium after an image is reproduced. The evaporation or exhausting of the suspending medium can be achieved by, for example, evacuating from the housing the liquid suspending medium through an outlet formed, for example, in the housing wall.

It has been discovered according to this invention that when at least one of the aforesaid first electrode and second electrode is coated with a semiconductive or insulating layer which is in contact with the aforesaid suspension layer, the device according to the present invention has an improved operating life. The semiconductive or insulating layer prevents the breakdown of the insulating property of the suspension layer even when a high electric voltage is applied between the electrodes or prevents the photosensitive electrophoretic material in the area not exposed to radiation from exchanging a charge with the electrode. Even when the electrode is coated with a semiconductive or insulating layer, the coated electrode can change the electrophoretic property of the photosensitive material under the influence of the actinic electromagnetic radiation and the applied electric field.

Figure 4:
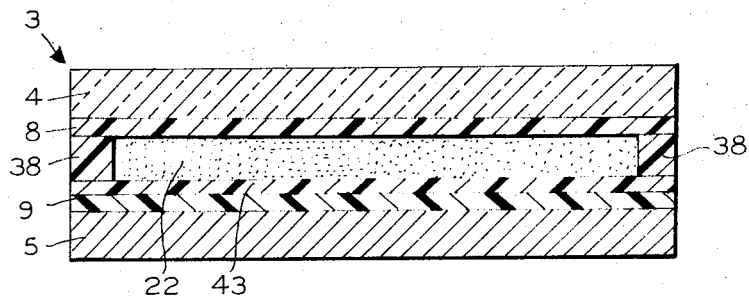
FIG. 4 is a cross-sectional view of an image reproduction panel according to another embodiment of this invention.

Referring to FIG. 4, wherein similar reference numbers designate components similar to those of the foregoing figures, a suspension layer 22 is provided which can be any possible electrophoretic suspension layer, such as the suspension layer 2, 14 or 18 of FIG. 1a, 2a or 3a. A second electrode 9 is coated with a semiconductive or insulating layer 43 which is not soluble in the suspending medium. Instead of just the second electrode 9, just the first electrode 8 or both the first and second electrodes 8 and 9 can be coated with semiconductive or insulating layers. The layer 43 is prepared by coating the second electrode with, for example, vinyl acetate resin, polystyrol, gelatin, cellophane or cellulose acetate. A transparent semiconductive or insulating layer is thus applied to a transparent electrode attached to a transparent housing wall. The thickness of said layer 43 depends on the electrical resistance which said insulating layer and the electrophoretic suspension layer 22 are required to have. It is preferable for operation at a low voltage that the layer 43 have an electrical resistance no higher than that of the suspension layer 22.

Figure 5:
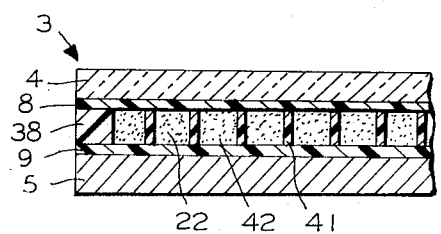
FIG. 5 is a cross-sectional view of an image reproduction panel according to still another embodiment of this invention.
Figure 6:
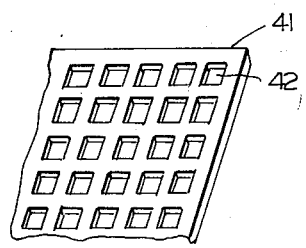
FIG. 6 is a schematic perspective view of a sheet with holes for use in the panel of FIG. 5.

Referring to FIG. 5, wherein similar reference numbers designate components similar to those of the foregoing figures, the suspension layer 22 has a plurality of spacers extending transversely thereof and consists of many small spaces filled with the suspension. An insulating sheet 41 with a lot of holes 42 therein, as shown in FIG. 6, can be used so as to divide the suspension layer 22 into separate suspension units. Holes 42 can have any suitable shape, such as square, as shown in FIG. 6; circular, rectangular, hexagonal, and so on. Holes 42 can be regular or irregular in shape, dimension and order. The dimensions of the holes 42 should be selected according to the purpose of the display or the nature of the suspension, but they must be at least greater than the dimensions of the material in a finely divided powder form suspended in the suspension. The advantage of dividing the suspension layer into a plurality of suspension units is that a uniform display can be produced because flow of the suspension is restricted to the interior of each space.

The amount of the photosensitive electrophoretic material in the suspending medium or the thickness of the electrophoretic suspension layer is selected, depending upon the hiding power, photosensitive property or electrophoretic property of the photosensitive electrophoretic material; the contrast range required in the reproduced image; the feasibility of the voltage source, and so on. Since the image reproduction device of the present invention is a reflective type, the suspension layer must be opaque in order to make an image of high contrast. The thicker the suspension layer, the higher the applied voltage which is usually required. The thinner the suspension layer, the denser the concentration of the photosensitive electrophoretic material and the color of the colored suspending medium must be to make an image of high contrast. The thickness of the suspension layer is usually from a few microns to a few mm.

EXAMPLE 1

One gram of an oilblack dye (supplied by the Kanto Chemical Company in Japan) is added to 100 ml. of kerosene to produce a deep violet suspending medium. Twenty-five grams of finely divided zinc oxide particles (supplied by the Kanto Chemical Company in Japan) is added to said colored suspending medium and is blended well in a ball mill to produce a gray violet suspension. A housing is filled with the suspension so as to form an electrophoretic suspension layer. Two major housing walls of the housing are made of an $SnO_2$ electrode (electrode 1) coated on a transparent glass plate and an aluminum plate (electrode 2). This electrically conductive glass is called EC glass. The aluminum plate has a gelatin layer with thickness of about $5\mu$ coated thereon and the gelatin layer is in contact with the suspension layer. The thickness of the suspension layer is $25\mu$, being defined by a frame of polyester film having a thickness of $25\mu$.

While projecting a negative light image from a projector on the electrode 1, a D.C. voltage of 500 v. is applied for a few seconds between electrode 1 and electrode 2, as an anode and a cathode, respectively. After the projection of the light image and the application of the D.C. voltage are stopped, a clear positive image is observed at the electrode 1 under the illumination of white light. In the above step, the application of a D.C. voltage of reverse polarity can also reproduce a similar positive image at the electrode 1. The reproduced image can be easily erased by applying a D.C. voltage of either polarity between electrodes 1 and 2, while electrode 1 is exposed uniformly to white light. The panel can reproduce a new image in a similar manner as described above. The brightnesses of the highlight of the projected image and of the uniform light for erasure are about 1500 luxes by a tungsten lamp.

EXAMPLE 2

Eight grams of finely divided Heliogen green GN particles, which are phthalocyanine green supplied by the BASF Company in Germany, is loaded to 100 ml. of paraffin liquid and blended well in a ball mill to produce a green paste.

Eight grams of hansa yellow G particles, which are an azo type organic pigment supplied by the Kanto Chemical Company in Japan, is added to 100 ml. of paraffin liquid and blended well in a ball mill to produce a yellow paste. Equal volumes of the two pastes are mixed well to produce a yellowish green paste. A housing as shown in FIG. 4 is filled with the yellowish green paste so as to form an electrophoretic suspension layer. The housing has two opposite major housing walls with a size of 60 x 60 mm. The two major housing walls are made of EC glass, and each has a thin film of the oxide ($SnO_2$) applied to the transparent glass plate. One of the two EC glass electrodes has a transparent gelatin layer with a thickness of about $5\mu$ coated thereon. A side frame is prepared from a $25\mu$ thick polyester film in a manner similar to that described above for Example 1. The thickness of the suspension layer is $25\mu$. The side faces of the housing are made liquid-tight by an adhesive agent, for example, Araldite, an adhesive commercially available from Ciba Limited in Switzerland, while each electrode is partially exposed to allow for connection of leads. The $SnO_2$ electrode having a gelatin layer coated thereon and the $SnO_2$ electrode having no gelatin layer are called electrode 1 and electrode 2, respectively, in the following description. While a black and white positive light image from a projector is projected on the suspension layer through electrode 2, a D.C. voltage of 500 V. is applied for three seconds between electrode 1 and electrode 2 as a cathode and an as an anode, respectively. The light image has the brightness of about 20,000 luxes at the highlight.

The projection of the light image is stopped after removal of the applied voltage. Under illumination of white light, a positive image having a yellow color in the image projected area and having a green color at the non-image area is clearly observed through electrode 2. On the other hand, the image observed through electrode 1 under illumination has a green color in the image projected area and a yellow color in the non-image area. The reproduced images can be held for a long time. While exposing the suspension layer to uniform white light of about 40,000 luxes through electrode 1, a D.C. voltage of 500 v. is applied between electrode 1 and electrode 2 as a cathode and as an anode, respectively, so as to erase the reproduced image and to make the panel uniformly yellow and uniformly green at the electrodes 1 and 2, respectively. In a similar manner to that described above, the image reproduction panel of this example is used to display new images as a changeable display panel.

Images can be reproduced in a similar manner by projecting a light image on the suspension layer through electrode 1. That is, electrode 1 having a gelatin layer coated thereon can exchange electric charge with photosensitive material under the influence of actinic light and the applied electric field. On the other hand, an image reproduction panel having the suspension layer of this example interposed between a pair of EC glass plates, neither of which are coated with gelatin layers, can also reproduce images in a manner similar to that described above.

On the other hand, the second imaging process described in the foregoing section can also be used for reproducing an image on the suspension layer. That is, a D.C. voltage of 500 v. is applied for three seconds between electrode 1 and electrode 2 as a cathode and as an anode, respectively, while a black and white positive light image having a brightness of 1000 luxes at the highlight is projected on the suspension layer through electrode 2. As soon as the projection of the light image and the application of the D.C. voltage are stopped, another D.C. voltage with reversed polarity is applied between electrode 1 and electrode 2 for two seconds. After removal of applied D.C. voltage, the panel shows, at the electrode 2 under illumination, a reproduced negative image which has a green color in the image area exposed to a strong light, a yellowish-green color in the image area exposed to a weak light, and a yellow color in the non-image area.

In the above step, the image pattern is not observed, and is almost uniformly green at the electrode 2 under illumination before the reversed D.C. voltage is applied between electrodes 1 and 2. This means clearly that the second imaging process described above can reproduce an image with high sensitivity by the projection of a dark light image. The reproduced image is erased by holding electrode 2 at a negative potential of 500 v. with respect to electrode 1, while exposing electrode 2 to a uniform white light. A new image is reproduced on the suspension layer in a manner similar to that described above.

In the suspension of this example, the Heliogen green particles have a remarkable property as photosensitive electrophoretic material. Therefore, this suspension layer is considered to be an electrophoretic suspension layer comprising one photosensitive electrophoretic material, in the visible light range, of Heliogen green particles suspended in a yellow suspending medium consisting of paraffin liquid and hansa yellow G particles suspended therein.

What is claimed is:

1. A photoelectrophoretic image reproduction device comprising an electrophoretic suspension layer having a colored suspending medium and at least one photosensitive electrophoretic material in a finely divided powder form suspended in said colored suspending medium, said suspension layer having two opposite major surfaces; a substantially transparent first electrode and a second electrode which are spaced from and opposed to each other and are positioned on said two opposite major surfaces of said suspension layer, respectively; means coupled to said electrodes to apply a D.C. electric field across the suspension layer between said electrodes; means operatively associated with said first electrode to expose said suspension layer to an image of actinic electromagnetic radiation through said first electrode, said electric field and said image electrophoretically changing the spatial distribution of said at least one photosensitive electrophoretic material so as to change the optical reflective property of the suspension layer in accordance with said image, whereby an image is reproduced.

2. A photoelectrophoretic image reproduction device as claimed in claim 1 wherein said colored suspending medium is a colored solution.

3. A photoelectrophoretic image reproduction device as claimed in claim 1 wherein said colored suspending medium is a suspending medium having a colored porous layer inserted therein.

4. A photoelectrophoretic image reproduction device as claimed in claim 1 wherein said colored suspending medium is a colored suspension.

5. A photoelectrophoretic image reproduction device as claimed in claim 1 wherein said at least one photosensitive electrophoretic material is a material the charge polarity of which can be changed by application of said D.C. electric field and by exposure to said image.

6. A photoelectrophoretic image reproduction device as claimed in claim 1 wherein said at least one photosensitive electrophoretic material is a material the electrophoretic mobility of which can be changed by application of said D.C. electric field and by exposure to said image.

7. A photoelectrophoretic image reproduction device as claimed in claim 1 wherein said second electrode is transparent.

8. A photoelectrophoretic image reproduction device as claimed in claim 1 wherein at least one of said first electrode and second electrode is coated with an insulating layer on the side thereof which is in contact with said suspension layer.

9. A photoelectrophoretic image reproduction device as claimed in claim 1 wherein said means for applying a D.C. electric field across the suspension layer between said electrodes includes means for controlling said electic field with respect to at least one property selected from the group consisting of strength, length of time of application, and polarity.

10. A photoelectrophoretic image reproduction device as claimed in claim 1 wherein said suspension layer further contains at least one control agent for said photosensitive electrophoretic material, selected from the group consisting of a charge control agent, a dispersion agent, a sensitizing agent and a fixing agent.

11. A photoelectrophoretic image reproduction device as claimed in claim 1 wherein said colored suspending medium is a hardenable material.

12. A photoelectrophoretic image reproduction device as claimed in claim 1 wherein said colored suspending medium is heat hardenable.

13. A photoelectrophoretic image reproduction device as claimed in claim 1 wherein said colored suspending medium is heat softenable.

14. A photoelectrophoretic image reproduction device as claimed in claim 1 wherein said means to expose said suspension layer to said image includes means to expose the whole of at least one surface of said suspension layer to said actinic electromagnetic radiation for erasing said image which is reproduced.

15. A photoelectrophoretic image reproduction device as claimed in claim 1 wherein said D.C. electric field is applied across the suspension layer at least while said suspension layer is exposed to said image.

16. A photoelectrophoretic image reproduction device as claimed in claim 15 wherein said D.C. electric field is further applied across the suspension layer before said suspension layer is exposed to said image.

17. A photoelectrophoretic image reproduction device as claimed in claim 15 wherein an electric field with reverse polarity with respect to said D.C. electric field is further applied across the suspension layer after removal of said D.C. electric field and said image from said suspension layer.

18. A photoelectrophoretic image reproduction device as claimed in claim 15 wherein an electric field with reverse polarity with respect to said D.C. electric field is further applied across the suspension layer before said D.C. electric field is applied across the suspension layer.

19. A photoelectrophoretic image reproduction device as claimed in claim 1 further including a housing enclosing said suspension layer.

20. A photoelectrophoretic image reproduction device as claimed in clim 19 wherein said housing has a transparent housing wall covering said transparent first electrode.

21. A photoelectrophoretic image reproduction device as claimed in claim 19 wherein said suspension layer has a plurality of spacers therein extending transversely thereof.

22. A photoelectrophoretic image reproduction device as claimed in claim 19 wherein said housing has a first major housing wall facing one of said electrodes, and the other of said electrodes forms a second major housing wall which is spaced from and opposed to said first major housing wall.

23. A photoelectrophoretic image reproduction device as claimed in claim 19 in which said housing has two spaced opposed major housing walls between which said suspension layer and said electrodes are positioned, and at least the housing wall facing said transparent first electrode is transparent.

24. A photoelectrophoretic image reproduction device as claimed in claim 23 wherein both of said two spaced opposed major housing walls and both of said electrodes are transparent.

References Cited

UNITED STATES PATENTS

| | | | |
|---|---|---|---|
| 3,573,904 | 4/1971 | Clark | 204—181 PE |
| 3,384,565 | 5/1968 | Tulagin et al. | 204—181 PE |
| 3,145,156 | 8/1964 | Oster | 204—299 PE |
| 3,511,651 | 5/1970 | Rosenberg | 204—181 PE |

JOHN H. MACK, Primary Examiner

W. T. SOLOMON, Assistant Examiner

U.S. Cl. X.R.

96—1 A; 204—181

Notice of Adverse Decision in Interference

In Interference No. 99,027, involving Patent No. 3,689,399, I. Ota, PHOTOELECTROPHORETIC IMAGE REPRODUCTION DEVICE, final judgment adverse to the patentee was rendered Oct. 28, 1976, as to claims 1, 5, 7, 9, 14, 15, 16, 17 and 19.

[*Official Gazette February 1, 1977.*]